Figure 14:
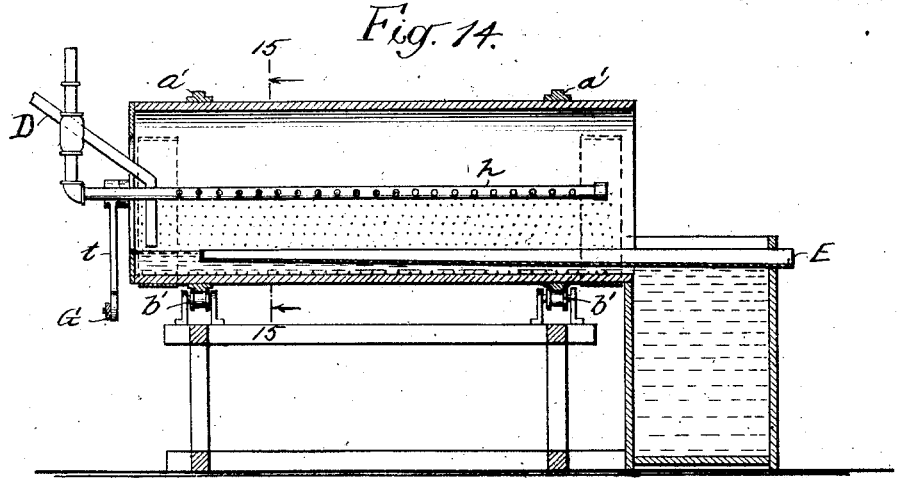

A. R. LIVINGSTON.
CONCENTRATION OF MINERALS BY FLOTATION.
APPLICATION FILED DEC. 27, 1913.
1,147,633.
Patented July 20, 1915.
5 SHEETS—SHEET 1.
Fig. 1,
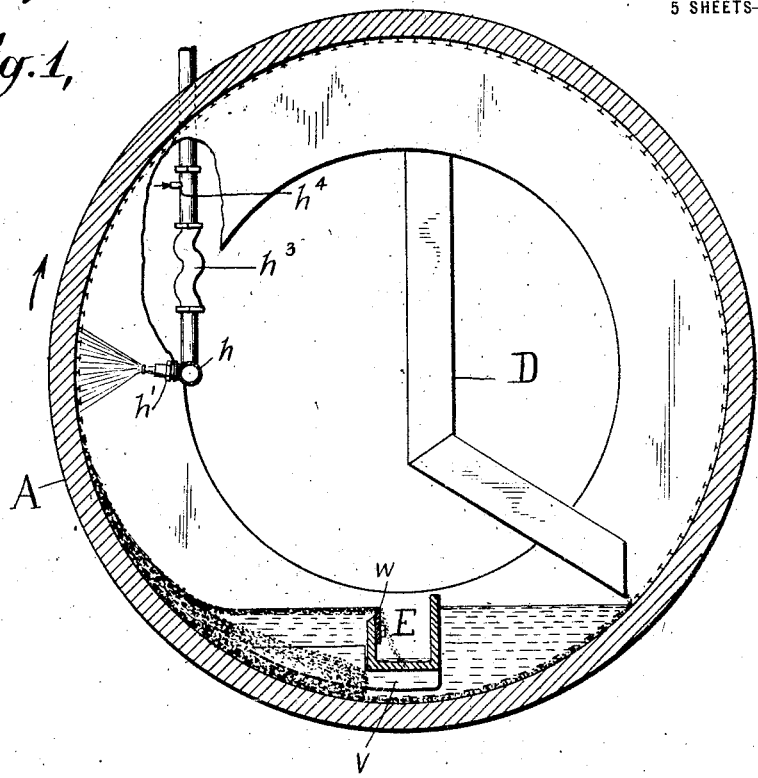
Fig. 2,
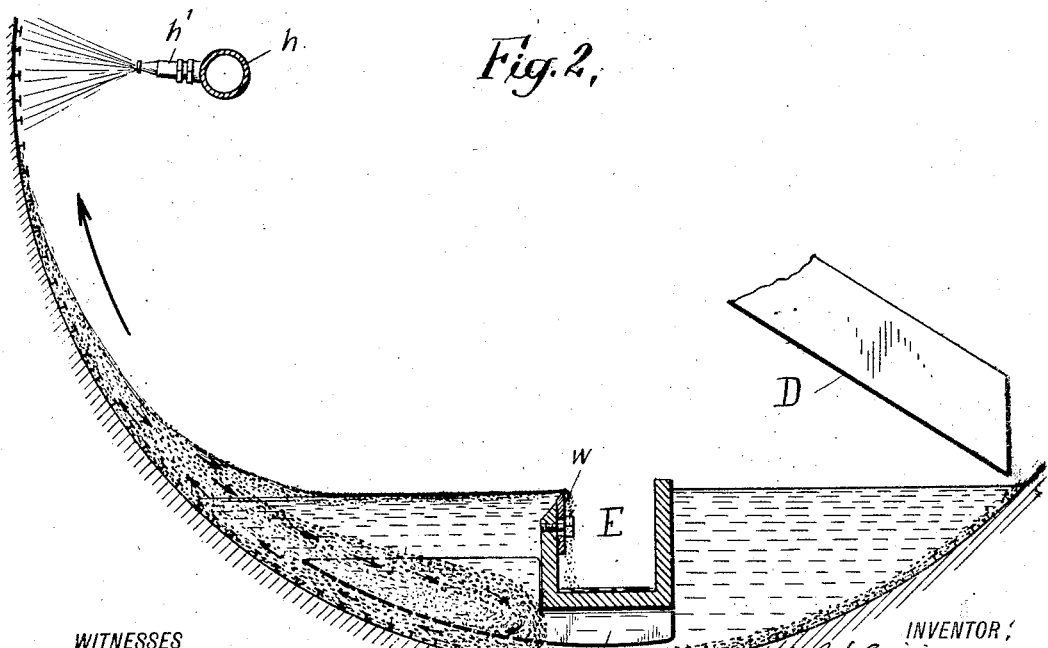
WITNESSES
INVENTOR:
A. R. Livingston
BY
ATTORNEYS

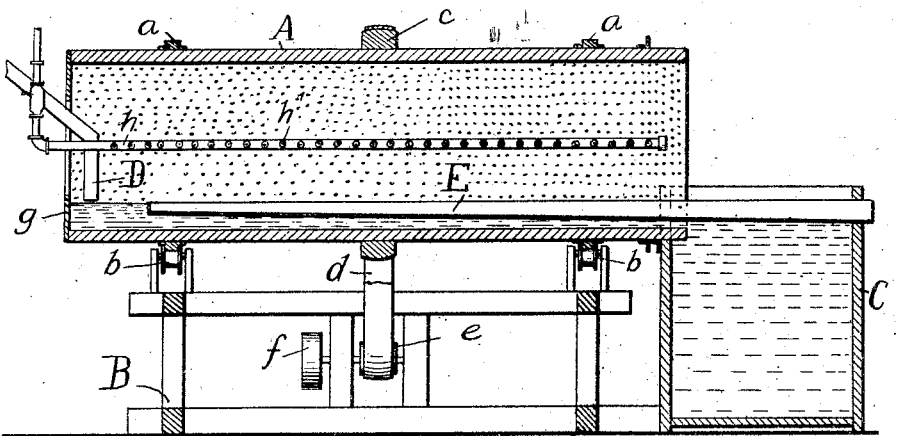
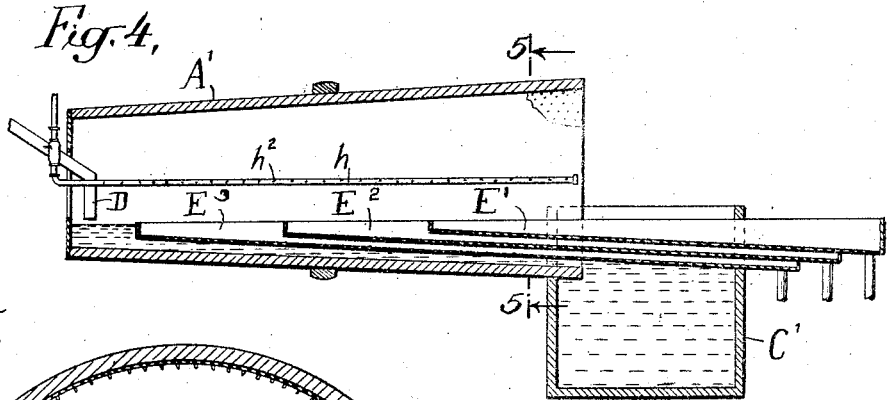
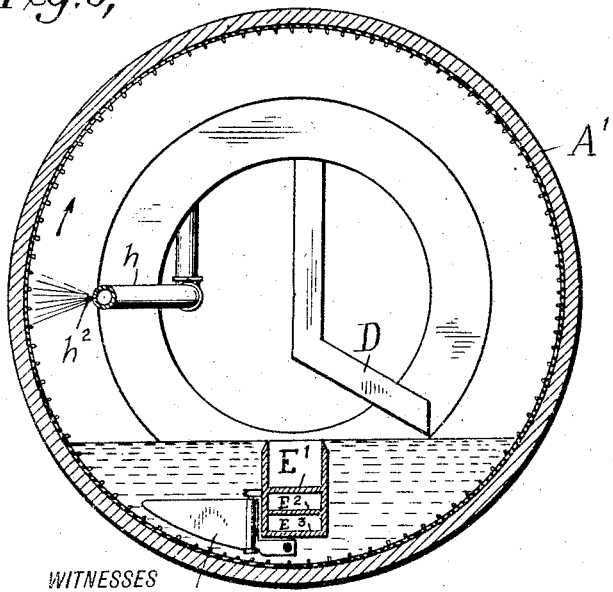

A. R. LIVINGSTON.
CONCENTRATION OF MINERALS BY FLOTATION.
APPLICATION FILED DEC. 27, 1913.
1,147,633.
Patented July 20, 1915.
5 SHEETS—SHEET 3.
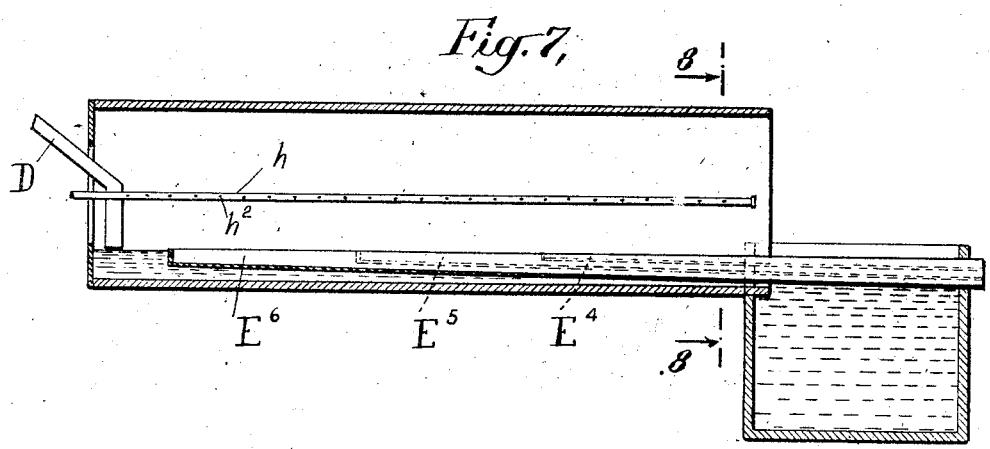
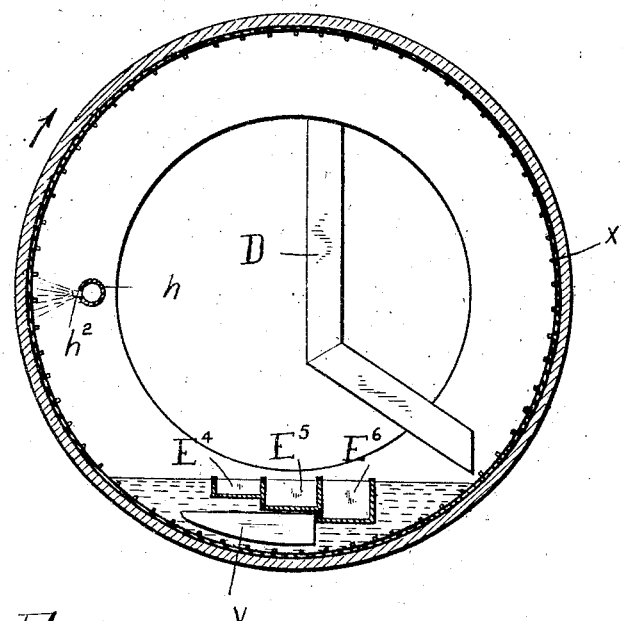
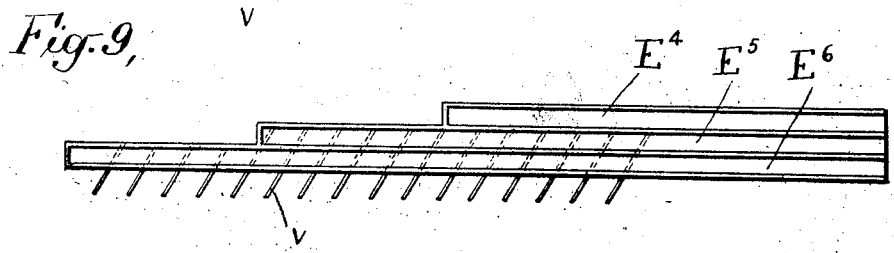
WITNESSES
INVENTOR:
A. R. Livingston,
BY
ATTORNEYS A. R. LIVINGSTON.
CONCENTRATION OF MINERALS BY FLOTATION.
APPLICATION FILED DEC. 27, 1913.
1,147,633.
Patented July 20, 1915.
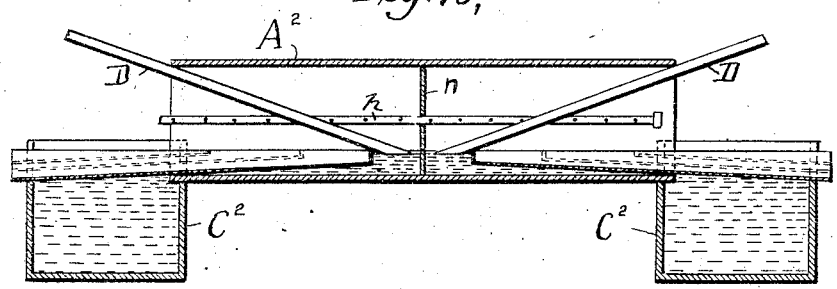
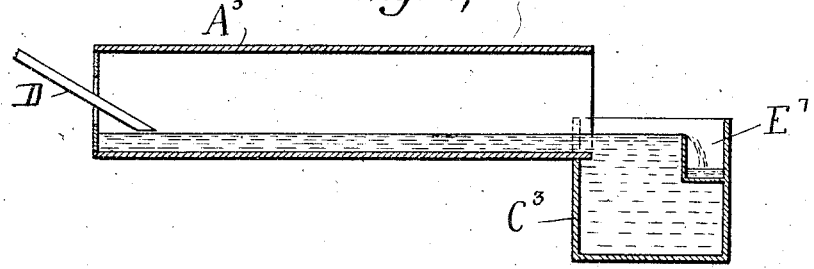
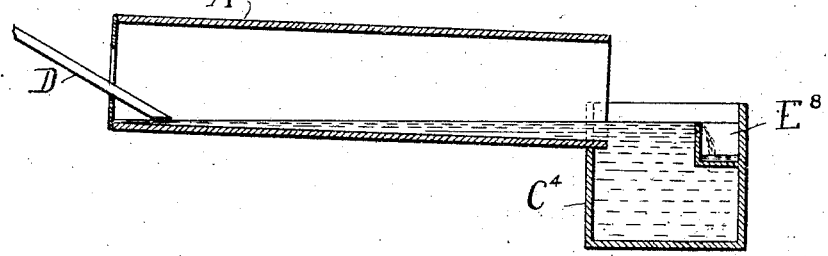
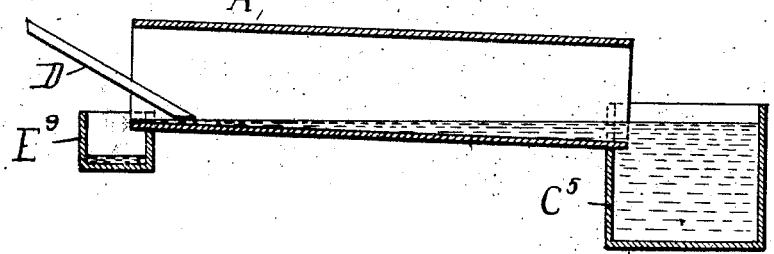

A. R. LIVINGSTON.
CONCENTRATION OF MINERALS BY FLOTATION.
APPLICATION FILED DEC. 27, 1913.

1,147,633.

Patented July 20, 1915.
5 SHEETS—SHEET 5.

WITNESSES
L. M. Sanders
M. A. Bill

INVENTOR:
A. R. Livingston
BY
Pennie, Davis & Goldsborough
ATTORNEYS

UNITED STATES PATENT OFFICE.

ARCHIBALD R. LIVINGSTON, OF CANON CITY, COLORADO, ASSIGNOR TO THE NEW JERSEY ZINC COMPANY, OF NEW YORK, N. Y., A CORPORATION OF NEW JERSEY.

CONCENTRATION OF MINERALS BY FLOTATION.

1,147,633. Specification of Letters Patent. Patented July 20, 1915.

Application filed December 27, 1913. Serial No. 808,945.

*To all whom it may concern:*

Be it known that I, ARCHIBALD R. LIVINGSTON, a citizen of the United States, residing at Canon City, county of Fremont, State of Colorado, have invented certain new and useful Improvements in the Concentration of Minerals by Flotation; and I do hereby declare the following to be a full, clear, and exact description of the invention, such as will enable others skilled in the art to which it appertains to make and use the same.

The present invention relates to the separation of floatable minerals from material with which they are associated.

It contemplates, as a preliminary operation, grinding or crushing the material to be separated, (for instance, zinc blende and other sulfids associated with calcite, silica, roasted pyrites, or the like) to say from 14 to 16 mesh, and then mixing the mass with the customary emulsion of sulfuric acid, oil and water, prior to flotation. The effect of the sulfuric acid is apparently to clean the oxid from the surface of the sulfid particles, and the oil thereupon envelops the cleaned particles, thus rendering them more susceptible to flotation. Calcite, silica, and the like, will not receive an oil film and are not subject to flotation thereby.

The present invention is based upon the conception that an effective disentanglement and flotation of the floatable minerals can be effected, by feeding the mixture into or upon a body of water, and then bringing it up through the surface of the water to such a height that the emerging top layer will meet a continuous downflow of water, which, as a thin film, encounters the rising material, disentangles the top layer thereof, thereby bringing it into suspension in the descending water film, lowering its angle of repose and causing it to flow down into the main body of water at so slight an angle to the surface thereof as to enter it quietly. The top layer of the continuously emerging material, being thus constantly renewed, and progressively brought into suspension, as described, so as to be in a condition of disentanglement, is thus presented to the flotation action of the main body of water, to exceptional advantage. The particles not susceptible to flotation drop below the surface of the water, and, during the further progress of the operation, are fed longitudinally of the apparatus employed, but are themselves repeatedly brought up through the body of water to meet the descending water film, as they travel toward the tailings receptacle, so as to gradually be relieved of such of the floatable minerals as they may chance to carry with them. The greater bulk of the separation incident to the practice of the invention is, however, effected during the primary stages thereof, that is to say, in the near vicinity of the feed of the material into the flotation apparatus, as will hereinafter more fully appear.

In order to insure that the body of the material undergoing separation shall rise through the surface of the water continuously and uniformly, I provide the flotation apparatus with suitable means for preventing any backward slide or slump of the material as a whole, which would otherwise occur unless provision is taken to guard against it. In practice, these means may conveniently consist of suitable projections distributed with uniformity over the interior periphery of the flotation apparatus, and of such a character as to prevent the back slide referred to, while not interfering with the disentanglement of the continuously emerging top layer by the downflowing water film.

A conspicuous advantage of the present invention resides in the fact that the downflowing film of water which meets the rising top layer of the material to be separated is supplied by water sprays and carries with it a notable quantity of air, which adheres to the oil-coated sulfids and facilitates their flotation. To further enhance this favorable effect, I prefer to take special means for increasing the quantity of air carried by the water film, as, for instance, by causing the pipes which supply water to the spray to automatically draw in air from the surrounding atmosphere.

In order that the operation shall be effective, the sulfids to be separated should be in the same condition as freshly mined sulfids, that is to say, substantially unaltered by surface oxidation, or should be restored to that condition by some appropriate treatment. The level of the water in the drum, in those instances where the drum is cylindrical and horizontal should preferably be established at a plane not higher than 45° above the lowest point of the drum, and the water spray should be applied to the internal periphery of the drum and at about the level of its central horizontal plane.

It has been found that the spray, which may proceed either from jet nozzles or from pipe apertures, can be applied to advantage from a longitudinally closed spray pipe, and the water should preferably be of low temperature (i. e., at least below the prevailing temperature of the atmosphere, and as much lower as is convenient),—a low temperature of the water being conducive to its capacity for retaining air in suspension therein.

The drum may be of equal diameter throughout, or it may taper, so as to be of larger diameter at one end than at the other; or it may be duplex, in the sense of having a transverse partition midway of its ends, so that the material to be separated can be fed into the water near the middle partition, on opposite sides thereof. So also, the drum may be placed either horizontally or at a slight incline.

The concentrates may be discharged either at the same end of the drum as the tailings, or at the opposite end. Thus, by providing a horizontal drum, at one of its ends, with an annular weir or dam, the concentrates may be floated over said dam at one end of the drum and the tailings discharged at the other end. Or, by making the dam sufficiently high, and providing an additional dam in the tailings receptacle, the concentrates can be taken off at the same end of the drum as the tailings. Or, if the drum is inclined, concentrates can be taken off at one end, and tailings at the opposite end, without providing a dam; in which case, the level of the water will merely reach to the lower edge of the upper open end of the drum, said upper open end constituting, in substance, a substitute for the annular weir of the dam. The concentrates can be separated or graded, during the operation, if desired, by means of a stationary trough or troughs entering the interior of the drum, as will hereinafter more fully appear.

In order to hasten the progress of the ore through the drum, there may be provided a series of upright adjustable blades, located in proximity to the lower inner wall of the drum, and having a forward slant or incline, so that when the ore is returned into the water, these slanting blades cause it to move correspondingly and progressively toward the tailings end of the drum. These slanting blades may be located, for instance, immediately below the trough or troughs, when the troughs are employed, and may be secured thereto.

As for the trough or troughs themselves, it will be understood that their side or sides rise to the level of the water, so that the floated minerals fall over the top edges of the trough when the apparatus is in service. In order that this falling over of the particles over the top edges of the troughs may take place smoothly, it is desirable to provide the top edges with a sheet of lead bolted or otherwise secured thereto in an upright position and capable of being planed off evenly to the level of the water, thereby making a clean smooth surface over which the floated particles can pass without hindrance.

As hereinbefore noted, the drum need not rotate continuously in one direction, but may oscillate, in which latter event, the water spray film will be applied to both sides of the oscillatory drum. Or, the drum may remain stationary and be provided with a lining, say of rubber, which may be oscillated inside of the stationary drum, so as to alternately raise the body of ore above the surface of the water. When the drum is oscillated, or when the oscillating lining is employed, it is likewise desirable to provide projections therefrom, as hereinbefore referred to for the purpose of carrying the emerging top layer to a higher level than its natural angle of repose, and for the purpose of preventing a backward slump of the ore as a whole.

Figure 15:
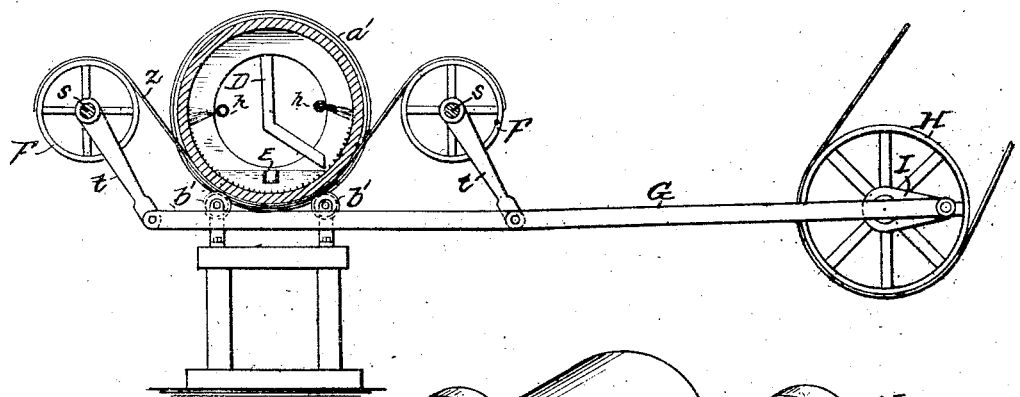
Figure 16:
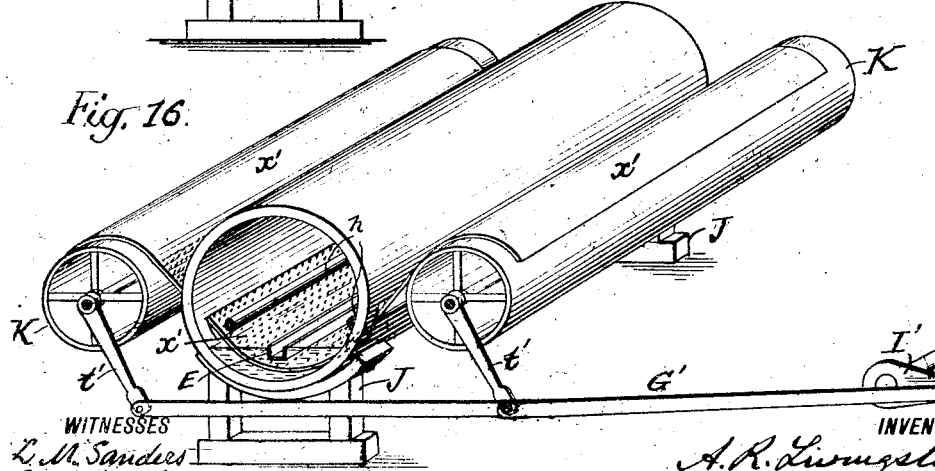

Referring to the drawings,—Figure 1 represents a cross-sectional view, partly in elevation, of a drum and its adjuncts, suitable for the practice of the invention; Fig. 2 represents a fragmentary view thereof, on a larger scale; Fig. 3 represents a longitudinal sectional view, on a somewhat smaller scale, of the apparatus shown in Figs. 1 and 2; Fig. 4 represents a like view of a modification, illustrating the employment of a plurality of separating troughs nested one within the other; Fig. 5 represents, on a larger scale, a sectional view taken on the line 5—5 of Fig. 4; Fig. 6 represents a fragmentary view thereof; Fig. 7 represents a view similar to Figs. 3 and 4 of a further modification of the invention, characterized by the employment of a series of troughs ranged side by side; Fig. 8 represents a cross-sectional view, taken on a somewhat larger scale on the line 8—8 of Fig. 7; Fig. 9 represents a top plan view of the troughs of the laterally arranged type shown in Figs. 7 and 8; Figs. 10, 11, 12 and 13, represent various modifications, in longitudinal section, the main elements of the apparatus being shown, without illustrating the more specific details of construction. Fig. 14 represents a vertical longitudinal section of a further modification, and Fig. 15 represents a cross-sectional elevation thereof on the line 15—15 of Fig. 14. Fig. 16 represents a still further modification, in perspective.

Referring to the drawings, A indicates an open-ended drum or barrel, which may be made of wood, and which is provided with metal bands *a* resting upon flanged idlers *b*

The drum or barrel is likewise provided with any suitable means for rotating or oscillating it, as, for instance, the band c attached thereto and driven by a belt d, from a sheave e, which, in turn, is driven from the driving pulley f, or the like. A foundation frame B, of any suitable character, supports the rotatory or oscillatory drum and its appurtenances.

In the form of the invention shown in Fig. 3, the drum A is shown as horizontal, and is provided at the feed end with an annular weir or dam g, as shown, for the purpose of maintaining a suitable water level in the drum. The tailings are received in a receptacle C, and the floated sulfids or concentrates are received in a trough E, having a longitudinally inclined bottom, as shown.

The supply of ore to be separated enters through the feed chute D, and may discharge in any suitable manner into the water contained within the drum, as, for instance, in proximity to the interior periphery thereof, near one end of the drum, as shown in Figs. 1, 2, 3, 7 and 8; or it may discharge upon or into the water in some other way, as, for instance, at or near the central vertical axial plane thereof, as indicated in Figs. 10 to 13, inclusive.

A perforated spray pipe $h$ is provided, extending longitudinally through the drum, which spray pipe may be provided with nozzles $h'$, as indicated in Figs. 1, 2 and 3, or with merely a row of perforations $h^2$, as shown in Figs. 4 and 5. The spray jet nozzles $h'$, or the perforations $h^2$, as the case may be, are in proximity to the rising side of the drum, and are so directed that the water therefrom will strike the inner wall of the rising side of the drum at or about the central horizontal axial plane thereof and will flow down in a practically unbroken sheet to meet the top layer of the emerging body or ore as it is carried up by the projections hereinbefore referred to. As indicated, the inner wall of the drum is provided with the said projections, which may conveniently take the form of headed tacks or brads, or the like, spaced about half an inch apart, and with some fair degree of uniformity of distribution.

In the practice of the invention, in the form of apparatus shown in Figs. 1, 2 and 3, the tailings receptacle is filled with water and the level is raised therein until it enters the drum and begins to flow over the end weir or dam g and likewise over the side of the trough E adjacent to the rising side of the drum. The drum is then rotated, for instance, in the direction of the arrow (Figs. 1 and 2), and the ore, which has first been stirred in a suitable agitating tank with the standard emulsion of oil, sulfuric acid and water, is fed continuously through the feed box or chute D into the water contained in the drum. As the drum rotates, the top layer of the ore thus fed into it is brought up as it emerges from the water to such a height that it meets a continuous downflow of water, which, as a thin film, encounters the rising material, disentangles the top layer from the rising side of the drum and the headed tacks or brads, and brings it into suspension in the descending water film. Accordingly, the angle of repose of the top portion of the emerging ore is lowered and it is caused to flow down into the main body of water at so slight an angle to the surface thereof as to enter it quietly. At the same time, the headed tacks or brads, or the like, prevent the back slide of the main body of ore, and even retain it at an angle higher than its normal angle of repose, thereby contributing to the relatively gentle manner in which the particles of the top layer which have been brought into suspension in the downflowing water film enter the main body of water within the drum. The top portion of the continuously emerging material, being thus constantly renewed, is progressively brought into suspension and flows into the main body of water within the drum, in a gentle manner, and at the surface thereof, in a condition of considerable disentanglement, and by means of a film of water relatively cold and highly aerated, is presented under particularly favorable conditions to the flotation action of the main body of water. Accordingly, the great bulk of the flotable particles is separated during the early stages of the operation, that is to say, in the vicinity of the feed end of the drum. The particles not susceptible to flotation drop below the surface of the water, and, during the further progress of the operation, are fed longitudinally of the apparatus employed, and, being themselves repeatedly brought up through the body of water to meet the descending water film, are gradually relieved of such of the floatable particles as they may chance to carry with them.

As hereinbefore indicated, the temperature of the water, if low, favors the separation because of its greater capacity, when cold, to occlude air, so that the water sprays are more efficient as a means for aerating the water film which they form, under such circumstances. To increase the aeration of the water, any suitable air injecting device may be employed; as, for instance, the ogee-pipe section $h^3$, which, inserted in the supply pipe, will draw in air through the open nipple $h^4$, thereby supplying the sprays or perforations with water containing a considerable increment of air. The slanting blades v, hereinbefore referred to, attached to the trough E, will serve to facilitate the longitudinal movement of the ore toward the tailings compartment.

In the form of the invention shown in Figs. 4 and 5, the drum is shown of a larger diameter at one end than at the other, although its central axial plane is horizontal. Instead of a single trough E, it contains three troughs $E'$ $E^2$ $E^3$, nested one within the other, so as to take off different grades of concentrates; the middlings may, if desired, be returned, for retreatment, which may be desirable, in some instances. It will, of course, be understood that the number of troughs employed may be varied, to suit particular conditions of use. As shown in Figs. 1 and 2, but one side only of the trough may be used for receiving the floated concentrates, that is to say, the side of the trough adjacent to the rising side of the drum, and this will be preferable in those instances where a greater flow of water over the edge of the trough is desired. Usually, the floated concentrates on the other side of the trough are inconsiderable in amount, but when it is desired to recover them also, the floated concentrates may be received over both sides of the trough, as indicated in Fig. 5, but, in such instance, the depth of the flow of water over the top edges of the trough, other conditions being equal, will be less, as will be readily understood.

In Figs. 1 and 2, I have indicated means which I prefer to employ in order to make the top edges of the trough smooth, and to keep them so. These means consist of an upright plate of lead $w$ attached to the wooden side of the trough by threaded bolts passing through slots in the plates. The upper edge of this lead plate may be planed off smooth, and, if nicked or otherwise worn during the service of the apparatus, may be replaned and readjusted in height, thereby providing a permanently smooth upper edge for the troughs.

In the form of the invention shown in Figs. 7, 8 and 9, I have retained the same general features of construction shown in Figs. 1, 2 and 3, but I have substituted for the trough E, three troughs $E^4$, $E^5$, $E^6$, arranged side by side, and of different depths and lengths, as indicated. These troughs are adapted to take off different grades of concentrates, as are the nested troughs of the apparatus shown in Figs. 4 and 5, and constitute a modification adapted for that purpose. In Fig. 8, I have also shown the feature of a rubber lining $x$ provided with rubber projections integral therewith and spaced uniformly apart at distances of about half an inch, these projections subserving the same general purposes as the headed tacks, but being capable of more ready application to the drum and more ready of replacement, in case of wear. This feature is more fully shown in Figs. 4 and 5.

Figs. 10 to 13 of the drawings illustrate various arrangements of the drum with relation to the tailings and concentrates receptacles. Thus, in $t^1$ form of the invention shown in Fig. 10 e arrangement and construction of the parts is substantially the same as in the form shown in Figs. 7, 8 and 9, except that the drum $A^2$, of Fig. 10, is provided with a central transverse partition $n$, thereby making it duplex, and the feed to the drum discharges in close proximity to this partition, on opposite sides thereof. So also, the tailings tanks $C^2$, are duplicated, as are also the sets of concentrates troughs.

In the form of the invention shown in Fig. 11, the troughs are omitted, the drum $A^3$ discharges into the tailings tank $C^3$, and the concentrates are received in the concentrates trough $E^7$. In the form of the invention shown in Fig. 12, the cylindrical drum $A^4$ is arranged at an incline, the same relative arrangement of parts being observed as in Fig. 11. In the form of the invention shown in Fig. 13, the drum $A^5$ is likewise shown as inclined, but is devoid of the annular weir at the feed end thereof, the edge of the upper end of the inclined drum serving as the weir or dam for the concentrates discharge. In Fig. 12, $C^4$, indicates the tailings receptacle and $E^8$, the concentrates receptacle. In Fig. 13, $C^5$ indicates the tailings receptacle and $E^9$, the concentrates receptacle.

It will, of course, be understood, that, inasmuch as Figs. 10 to 13, are intended merely to illustrate the relative modifications of the arrangement of the rotatory or oscillatory drum with respect to the tailings receptacles and concentrates receptacles, the illustration of the other features thereof, as, for instance, the spray pipe, the internal projections, and the like, have been omitted as unnecessary.

In Figs. 14 and 15, I have illustrated a modification of the invention, wherein the drum is adapted to oscillate. To this end, the drum may be provided with bands $a'$ for supporting it upon the idler rolls $b'$, as shown. In order to oscillate the drum, a band $z$ of any suitable flexible material may be attached to the drum's periphery and to the periphery of two independently mounted sheaves or band-wheels F, which are fixed upon rock-shafts $s$. These rock-shafts may be connected to actuating arms $t$, connected to a pitman G, adapted to be reciprocated in any suitable manner, as, for instance, by the power driven pulley H and its crank I. The features of construction of the drum and its accessories are the same as in Figs. 1, 2 and 3, except that the water-spray is duplicated, as shown particularly in Fig. 15, so that the water-spray film may be applied to both sides of the oscillatory drum.

In the form of the invention shown in

Fig. 16, the drum is made stationary, for which purpose it may rest upon and be attached to suitable cradle supports J. It is provided with a lining *x'* of rubber, provided with projections as shown, and this lining is oscillated in any suitable manner, as, for instance, by attaching its ends to the rocking cylinders K, adapted to be rocked by the arms *t'* connected to the pitman G', which latter is reciprocated by a crank I', or otherwise. In this modification, also, the spray-pipe is duplicated.

What I claim is:

1. The method of separating floatable minerals from material with which they are associated, which consists in feeding the mixture into a body of water, progressively raising it through the surface of the water, meeting the emerging top layer by a downflowing film of water, and floating the top layer thereby into the main body of water at the surface thereof and collecting the material thereby separated separately from that which sinks; substantially as described.

2. The method of separating floatable minerals from material with which they are associated, which consists in feeding the mixture into a body of water, progressively raising it through the surface of the water at an angle greater than its natural angle of repose, lowering the angle of repose of the emerging top layer by a downflowing film of water and floating the top layer into the main body of the water at the surface thereof and collecting the material thereby separated separately from that which sinks; substantially as described.

3. The method of separating floatable minerals from material with which they are associated, which consists in feeding the mixture into a body of water, progressively raising it through the surface of the water, meeting the emerging top layer by a downflowing film of aerated water and floating thereby the top layer into the main body of water at the surface thereof; substantially as described.

4. The method of separating floatable minerals from material with which they are associated, which consists in feeding the mixture into a body of water, progressively raising it through the surface of the water, meeting the emerging top layer by a downflowing film of water produced by spray jets and floating thereby the top layer into the main body of water at the surface thereof and collecting the material thereby separated separately from that which sinks; substantially as described.

5. The method of separating floatable minerals from material with which they are associated, which consists in feeding the mixture into a body of water, progressively raising it through the surface of the water, meeting the emerging top layer by a downflowing film of water produced by spray jets of aerated water, and floating thereby the top layer into the main body of water at the surface thereof; substantially as described.

6. The method of separating floatable minerals from material with which they are associated, which consists in feeding the mixture into the body of water, progressively raising it through the surface of the water at an angle greater than its natural angle of repose, meeting the emerging top layer by a downflowing film of water and thereby lowering the angle of repose of the top layer, said downflowing film of water being impregnated with air, and floating the top layer into the main body of water at the surface thereof; substantially as described.

7. Apparatus for the separation of floatable minerals from material with which they are associated, said apparatus comprising a rotatory drum, means for maintaining a body of flotation liquid therein, means for feeding the material to be separated into the flotation liquid, means for supplying a downflow film of water to the inner periphery of the drum on the rising side thereof, and means for collecting material floated upon the body of flotation liquid separately from that which sinks; substantially as described.

8. Apparatus for the separation of floatable minerals from material with which they are associated, said apparatus comprising a rotatory drum, means for maintaining a body of flotation liquid therein, means for feeding the material to be separated into the flotation liquid, a spray pipe for supplying wash water to the inner periphery of the drum above the water level thereof and means for collecting material floated upon the body of flotation liquid separately from that which sinks; substantially as described.

9. Apparatus for the separation of floatable minerals from material with with they are associated, said apparatus comprising a rotatory drum, means for maintaining a body of flotation liquid therein, means for feeding the material to be separated into the flotation liquid, a spray pipe for supplying wash water to the inner periphery of the drum above the water level thereof, and means for drawing air into the wash-water prior to its discharge from the spray pipe; substantially as described.

10. Apparatus for the separation of floatable minerals from material with which they are associated, said apparatus comprising a rotatory drum, means for maintaining a body of flotation liquid therein, means for feeding the material to be separated into the flotation liquid, means for supplying a downflow film of water to the inner periphery of the drum on the rising side thereof, and a collector comprising a trough-structure extending into the drum, and whose edges constitute weirs for the overflow of the floatable concentrates; substantially as described.

11. Apparatus for the separation of floatable minerals from material with which they are associated, said apparatus comprising a rotatory drum, means for maintaining a body of flotation liquid therein, means for feeding the material to be separated into the flotation liquid, means for supplying a downflow film of water to the inner periphery of the drum on the rising side thereof, and a collector comprising a trough-structure extending into the drum, and whose edges constitut weirs for the overflow of the floatable concentrates, the weir edges of the troughs being provided with adjustable wear-plates; substantially as described.

In testimony whereof I affix my signature, in presence of two witnesses.

ARCHIBALD R. LIVINGSTON.

Witnesses:
   M. A. BILL,
   JOHN CHEMIE.